United States Patent [19]
Sakamoto

[11] Patent Number: 5,990,973
[45] Date of Patent: Nov. 23, 1999

[54] RED-EYE DETECTION/RETOUCH APPARATUS

[75] Inventor: Shizuo Sakamoto, Tokyo, Japan

[73] Assignee: NEC Corporation, Tokyo, Japan

[21] Appl. No.: 08/864,431

[22] Filed: May 28, 1997

[30] Foreign Application Priority Data

May 29, 1996 [JP] Japan .................................. 8-135427

[51] Int. Cl.⁶ .............................. H04N 5/14; H04N 9/64; G03B 27/80
[52] U.S. Cl. .......................... 348/576; 348/246; 382/117; 382/167; 382/190; 396/18
[58] Field of Search .................................... 348/576, 246; 382/162, 163, 167, 274, 275, 254, 255, 115, 117, 190, 195, 203; 396/18, 51

[56] References Cited

U.S. PATENT DOCUMENTS

| | | | |
|---|---|---|---|
| 4,978,989 | 12/1990 | Nalamo et al. | 345/413 |
| 5,432,863 | 7/1995 | Benati et al. | 382/167 |
| 5,432,866 | 7/1995 | Sakamoto | 382/128 |
| 5,572,596 | 11/1996 | Wildes et al. | 382/117 |
| 5,748,764 | 5/1998 | Benati et al. | 382/117 |
| 5,805,720 | 9/1998 | Suenaga et al. | 382/117 |

FOREIGN PATENT DOCUMENTS

| | | |
|---|---|---|
| 52-80120 | 7/1977 | Japan . |
| 3-205989 | 9/1991 | Japan . |
| 4-192681 | 7/1992 | Japan . |
| 5-19382 | 1/1993 | Japan . |
| 5-224271 | 9/1993 | Japan . |
| 5-300531 | 11/1993 | Japan . |
| 6-258732 | 9/1994 | Japan . |
| 6-350914 | 12/1994 | Japan . |
| 7-13274 | 1/1995 | Japan . |
| 7-95597 | 4/1995 | Japan . |
| 7-287312 | 10/1995 | Japan . |
| 9-44691 | 2/1997 | Japan . |
| 9-261580 | 10/1997 | Japan . |

OTHER PUBLICATIONS

"Image Analysis Handbook", Tokyo University Press (1991), pp. 486–487.

*Primary Examiner*—John K. Peng
*Assistant Examiner*—Linus H. Lo
*Attorney, Agent, or Firm*—Foley & Lardner

[57] ABSTRACT

In a red-eye detection/retouch apparatus, a first area extraction unit receives an image including a red eye and a signal representing a small area including the red eye and designated by a user and extracts a first area including the red eye. A first pixel selection unit detects the reddest pixel from the first area and outputs coordinate values and color information of the pixel. A determination unit determines whether the other red eye is present on the basis of the signal representing the small area and the coordinate values of the reddest pixel. The determination unit outputs an instruction signal for extracting a second area where the other red eye is present upon determining that the other red eye is present. A second area extraction unit receives the instruction signal and extracts the second area from the first area. A second pixel selection unit detects the reddest pixel from the second area and outputs coordinate values and color information of the pixel. An area expansion unit receives the coordinate values and color information of the pixels and the first area, detects a red-eye area by area expansion, and outputs the red-eye area. An image synthesis unit receives the red-eye area and the image including the red eye and outputs an image whose red-eye area has been corrected to a natural pupil color.

10 Claims, 6 Drawing Sheets

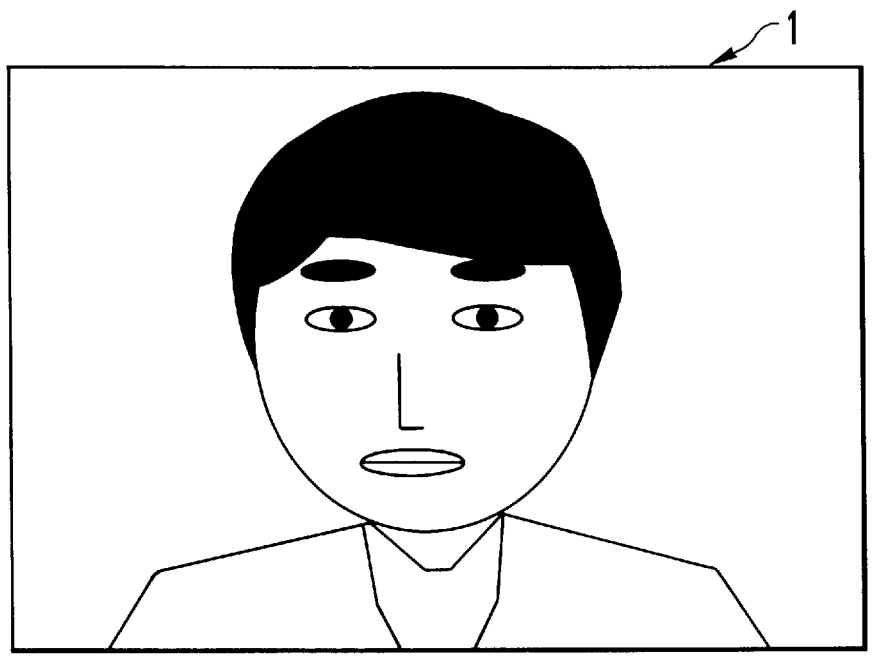
FIG. 2
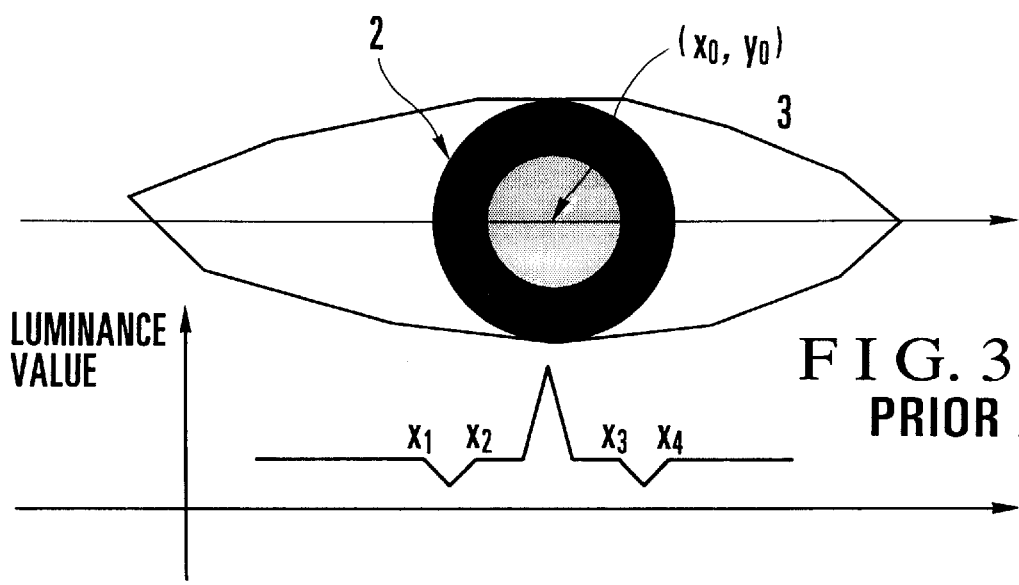
FIG. 3A
PRIOR ART
FIG. 3B
PRIOR ART

RED-EYE DETECTION/RETOUCH APPARATUS

BACKGROUND OF THE INVENTION

The present invention relates to a high-quality portrait image forming apparatus for obtaining a more natural portrait image from a portrait image and, more particularly, to a red-eye detection/retouch apparatus for correcting a portrait image including red pupils photographed in use of a flashbulb to a portrait image having a more natural pupil color.

When the periphery of a target object is dark, and a person is to be photographed with a camera using a flashbulb, the pupil portions of eyes are often photographed as red eyes. When the periphery is dark, the pupil of the eye is open. The flashlight is reflected by the retina through the pupil and reaches the camera, resulting in such an unnatural image. Particularly, along with recent size reduction of cameras, the optical axis of the photographing lens approaches that of the flashbulb, and the red-eye phenomenon tends to easily occur.

In a "prevention of red-eye effect at flashlight photography" disclosed in Japanese Patent Laid-Open No. 52-80120, only the flashbulb is caused to emit light in advance immediately before the photographing operation to contract the pupils, thereby preventing the red-eye phenomenon in the photographing operation. However, this method may give a sense of incompatibility to the object person or largely consume the battery.

In an "electric camera" disclosed in Japanese Patent Laid-Open No. 4-192681, flashlight photographing and normal photographing are continuously performed to detect and remove a reflection component due to the flashlight. However, when the object person is moving, a positional shift may be generated between the two photographed images, or the reflection component cannot be effectively detected because the normally photographed image is dark.

In an "image processor" disclosed in Japanese Patent Laid-Open No. 5-224271 which uses information representing the presence/absence of use of a flashbulb, the focal length information of the photographing lens, distance information between the photographing lens and the electronic flash light-emitting portion in the photographing operation, these pieces of information must be acquired and transmitted to the image processing unit in the photographing operation. However, a camera having such a function is not general and therefore is not effective. Accordingly, red-eye detection/retouch apparatuses for detecting photographed red eyes and correcting the red eyes to a natural color tone of the eyes are conventionally proposed and used.

FIG. 2 shows an input image signal 1 including a red eye as an example of an input image. On this input image, assume that the pupil at the central portion of each eye is red. Two examples of a conventional "pink-eye effect position detector" disclosed in Japanese Patent Laid-Open No. 6-258732 will be described below.

As the first example, an apparatus having the following function is described in the above prior art. The color image of a color film which has undergone development is picked up to obtain a film image. At least one of the low chroma part and the low illuminance part of the film image is extracted, thereby extracting an area including a black eye. In addition, an area including the face is extracted by extracting a skin color part from the film image. Similarly, a pink-eye area is extracted by extracting a red color part from the film image. The pink-eye area is automatically detected under a condition that the pink-eye area (pink eye) exists in the black area (pupil) in the skin color part (face). In the embodiment of this prior art, the unit for detecting the face and pupil area is realized by threshold processing, and the unit for detecting the pink-eye area in the pupil in the face is realized by a combination of area expansion and AND. An embodiment in which the area is selected considering that the face or eye has an almost elliptical shape is also described in this prior art.

As the second example, an apparatus having the following function is described in the prior art. As in the above-described conventional apparatus, the user designates a point in the pink-eye area of a color film image by using a coordinate designation unit such as a touch panel, thereby acquiring color information of the designated point. Pink-eye area detection is realized by extracting an area having a color close to the color information by threshold processing.

Two examples of a conventional red-eye detection/retouch apparatus based on a "pink-eye effect retouch system" disclosed in Japanese Patent Laid-Open No. 6-350914 will be described below.

As the first example, an apparatus having the following function is described in this prior art. The image of a negative color film which has undergone development is converted into a film image by a scanner. Thereafter, colors in the film image are subjected to threshold processing, thereby detecting a pink-eye area. After the contour line of the detected area is extracted, the density distribution of pixels on an x axis (horizontal line) passing the center of gravity $(x_0, y_0)$ of the contour line is checked, as shown in FIG. 3A. When x1 and x4 corresponding to an iris edge 2 are detected, as shown in FIG. 3B, a pink-eye area is finally determined, thereby realizing pink-eye area detection. Reference numeral 3 denotes a pupil as a pink-eye portion.

This conventional apparatus performs pink-eye detection processing for the entire frame. The performance of pink-eye detection processing is poor, and detection often fails. For this reason, the original pink-eye area may not be detected, or an area other than the pink-eye area may be detected as a pink-eye area. To solve this problem, the second example having the following function is described in the prior art. The user designates a small area including a pink eye shown in FIG. 4 using a touch panel or the like as a pink-eye designation area 4. The above processing is performed only for the pink-eye designation area. With this arrangement, an apparatus for preventing detection failures is realized without increasing the work load to the user.

In a "red-eye effect correcting device" disclosed in Japanese Patent Laid-Open No. 7-13274 as well, the user designates an area where two red eyes exist, as shown in FIG. 5, using a touch panel or the like. Thereafter, threshold processing is performed on the basis of the average chromaticity of the area, thus realizing recd-eye area detection.

The conventional processing of automatically detecting the pink- or red-eye area uses threshold processing based on colors or the shape of an area which has been detected by the threshold processing. A technique applied to the entire frame is not practical because of its low detection accuracy, as is known. On the other hand, the method of causing the user to designate a point in the red-eye area increases the work load to the user in designation because the red-eye area is very small on the image. The compromise idea of these two methods, i.e., the method of causing the user to designate a small area including red eyes is effective because the work load to the user is small, and detection failures can be suppressed. In this conventional method, however, red-eye detection processing for the entire frame is only simply applied to the specific area, and the shape information of the area given by the user or position information of the detected red-eye area is not positively used. For this reason, it can hardly be said that detection errors can be sufficiently reduced, and a further improvement is required.

SUMMARY OF THE INVENTION

It is an object of the present invention to provide a red-eye detection/retouch apparatus which automatically determines the number of red eyes in a small area including one or two red eyes designated by the user, thereby detecting the positions of the red eyes and correcting the red eyes.

In order to achieve the above object, according to the present invention, there is provided a red-eye detection/retouch apparatus comprising first area extraction means for receiving an image including a red eye and a signal representing a small area including the red eye and designated by a user and extracting a first area including the red eye, first pixel selection means for detecting the reddest pixel from the first area output from the first area extraction means and outputting coordinate values and color information of the detected pixel, determination means for determining whether the other red eye is present on the basis of the signal representing the small area including the red eye and designated by the user and the coordinate values of the reddest pixel output from the first pixel selection means, the determination means outputting an instruction signal for extracting a second area where the other red eye is present upon determining that the other red eye is present, second area extraction means for receiving the instruction signal output from the determination means and extracting the second area from the first area output from the first area extraction means, second pixel selection means for detecting the reddest pixel from the second area output from the second area extraction means and outputting coordinate values and color information of the detected pixel, area expansion means for receiving the coordinate values and color information output from the first pixel selection means, the coordinate values and color information output from the second pixel selection means, and the first area output from the first area extraction means, detecting a red-eye area by area expansion, and outputting the red-eye area, and image synthesis means for receiving the red-eye area output from the area expansion means and the image including the red eye and outputting an image whose red-eye area has been corrected to a natural pupil color.

BRIEF DESCRIPTION OF THE DRAWINGS

FIG. 2 is an explanatory view of an input image signal;

FIGS. 3A and 3B are views for explaining a method of detecting an iris edge by a conventional red-eye detection/retouch apparatus;

DESCRIPTION OF THE PREFERRED EMBODIMENTS

Figure 1:
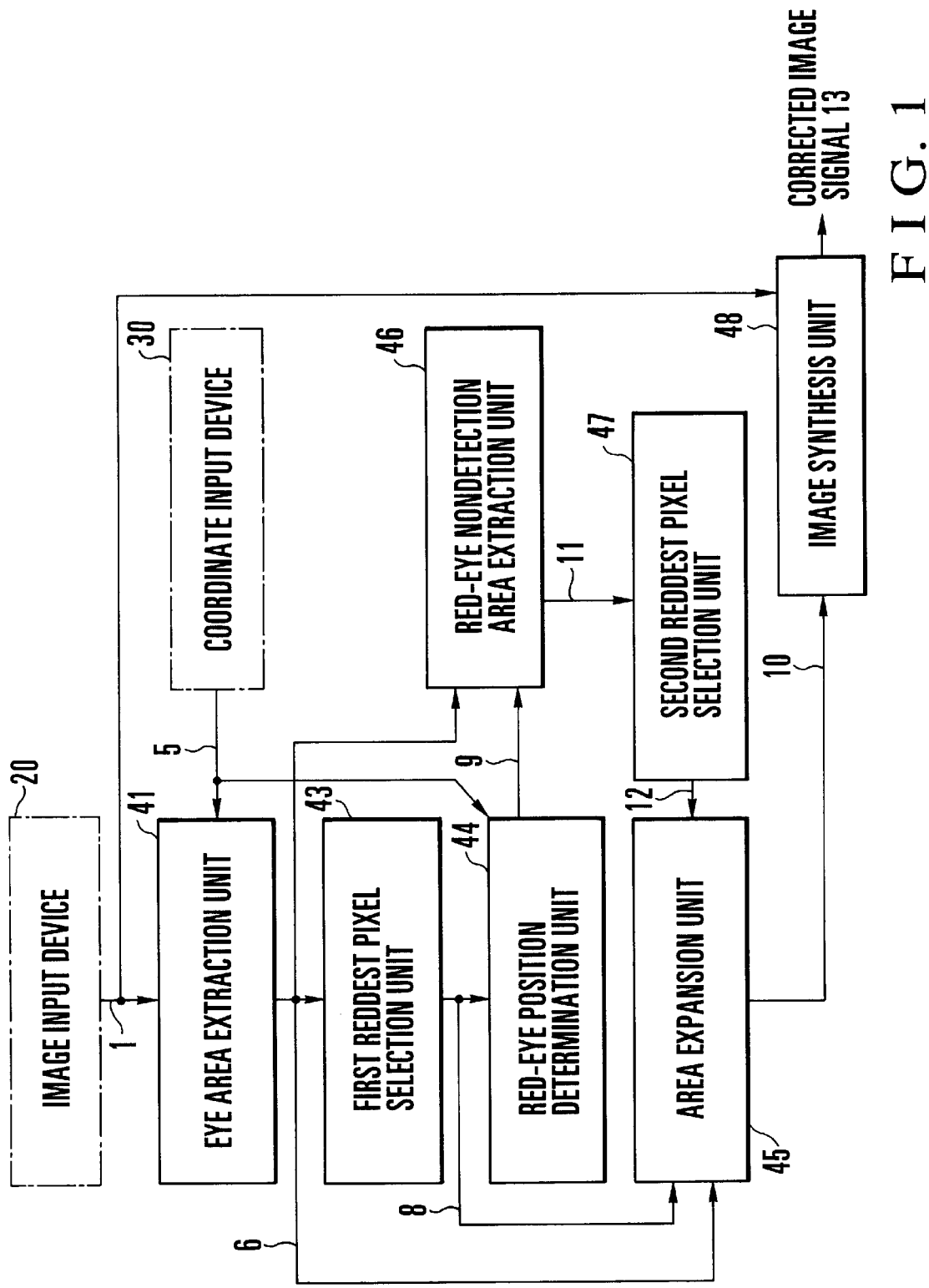
FIG. 1 is a block diagram showing the arrangement of a red-eye detection/retouch apparatus according to the first embodiment of the present invention.
Figure 4:
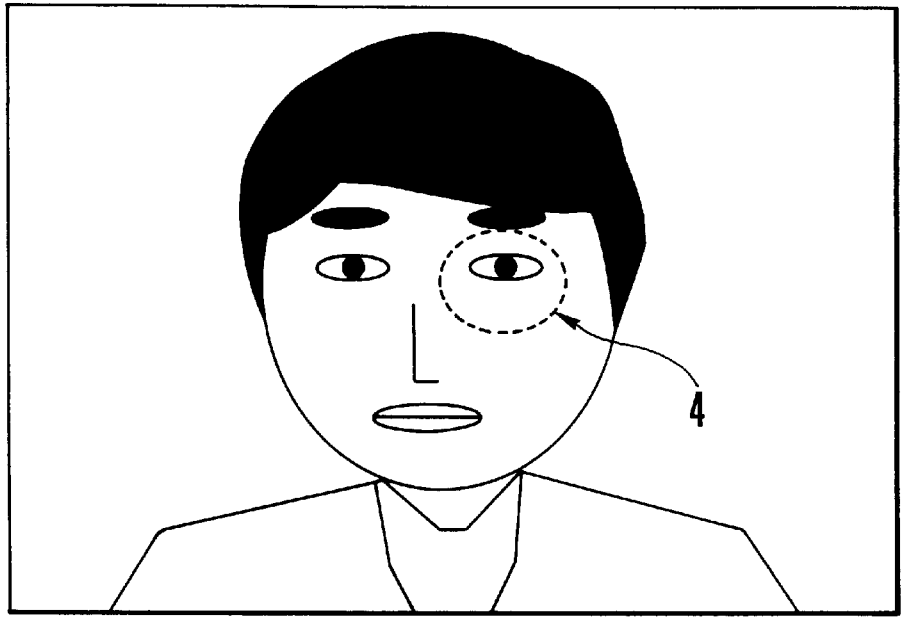
FIG. 4 is an explanatory view of conventional designation of an area including a red eye.
Figure 5:
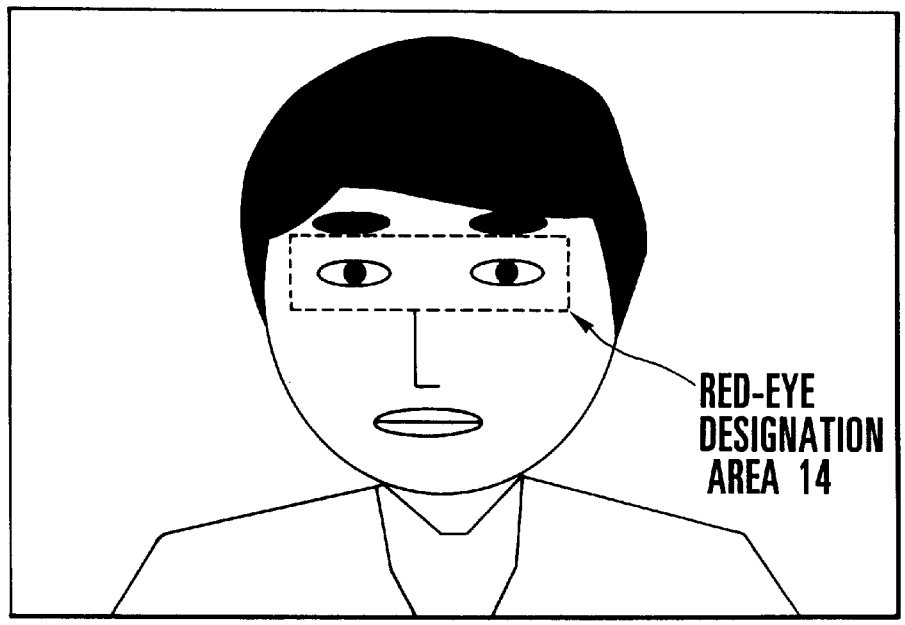
FIG. 5 is an explanatory view of conventional designation of an area including two eyes.

FIG. 1 shows the arrangement of a red-eye detection/retouch apparatus according to the first embodiment of the present invention. Referring to FIG. 1, an input image signal 1 including a red eye and obtained by an image input device 20 and an area designation signal S obtained by a coordinate input device 30 and representing a small area including the red eye and designated by the user are input to an eye area extraction unit 41. The area including the red eye is extracted and output as an eye area image signal 6. The area designation signal 5 represents a rectangular area having a size $(X_L, Y_L)$. The eye area image signal 6 is input to a first reddest pixel selection unit 43 to detect the reddest pixel. The coordinate values and color information of the detected pixel are output as a first red-eye position and color signal 8.

The area designation signal 5 and the first red-eye position and color signal 8 are input to a red-eye position determination unit 44 to determine whether the other red eye is present on the basis of the red-eye detection position in the designated area. If the red eye is detected at the edge of the area, it is determined that the other red eye is present on the opposite side. An area extraction driving signal 9 is output as an instruction signal for extracting the area where the other red eye is present. When the coordinate position of the detected red eye is represented by $(x_e, y_e)$, this determination is executed in accordance with conditions (1) below:

$$\begin{cases} \text{When } x_e < \lambda_0 X_L, \text{ red eyes are present} \\ \quad \text{for } x \text{ coordinate value of } \mu_0 X_L \text{ to } X_L \\ \text{When } \lambda_1 X_L < x_e, \text{ red eyes are present} \\ \quad \text{for } x \text{ coordinate value of } 0 \text{ to } \mu_1 X_L \\ \text{Otherwise, only one red eye is present} \\ \quad \text{within the area} \end{cases} \quad (1)$$

where $\lambda_0$, $\lambda_1$, $\mu_0$, and $\mu_1$ are predetermined parameters having a value between 0 and 1.

Upon receiving the eye area image signal 6, a red-eye nondetection area extraction unit 46 extracts the area where the other red eye exists on the basis of the area extraction driving signal 9 and outputs the area as a nondetection area image signal 11. Upon receiving the nondetection area image signal 11, a second reddest pixel selection unit 47 detects the reddest pixel and outputs the coordinate values and color information of the detected pixel as a second red-eye position and color signal 12.

Upon receiving the first red-eye position and color signal 8 and the second red-eye position and color signal 12, an area expansion unit 45 sequentially extends the area of pixels having similar colors around the detected pixel, thereby detecting a red-eye area and outputting the area as a red-eye area signal 10. Upon receiving the red-eye area signal 10 and the input image signal 1, an image synthesis unit 48 changes (corrects) the red-eye area to a natural pupil color and outputs a natural portrait image as a corrected image signal 13.

In the first embodiment, the area expansion unit 45 sequentially expands the area of pixels having similar colors around the detected pixel to detect the red-eye area. Red-eye detection can also be performed even by extending a circular area in consideration of the shape of the iris, or even by detecting the iris edge and extending the area inside the edge.

Figure 6:
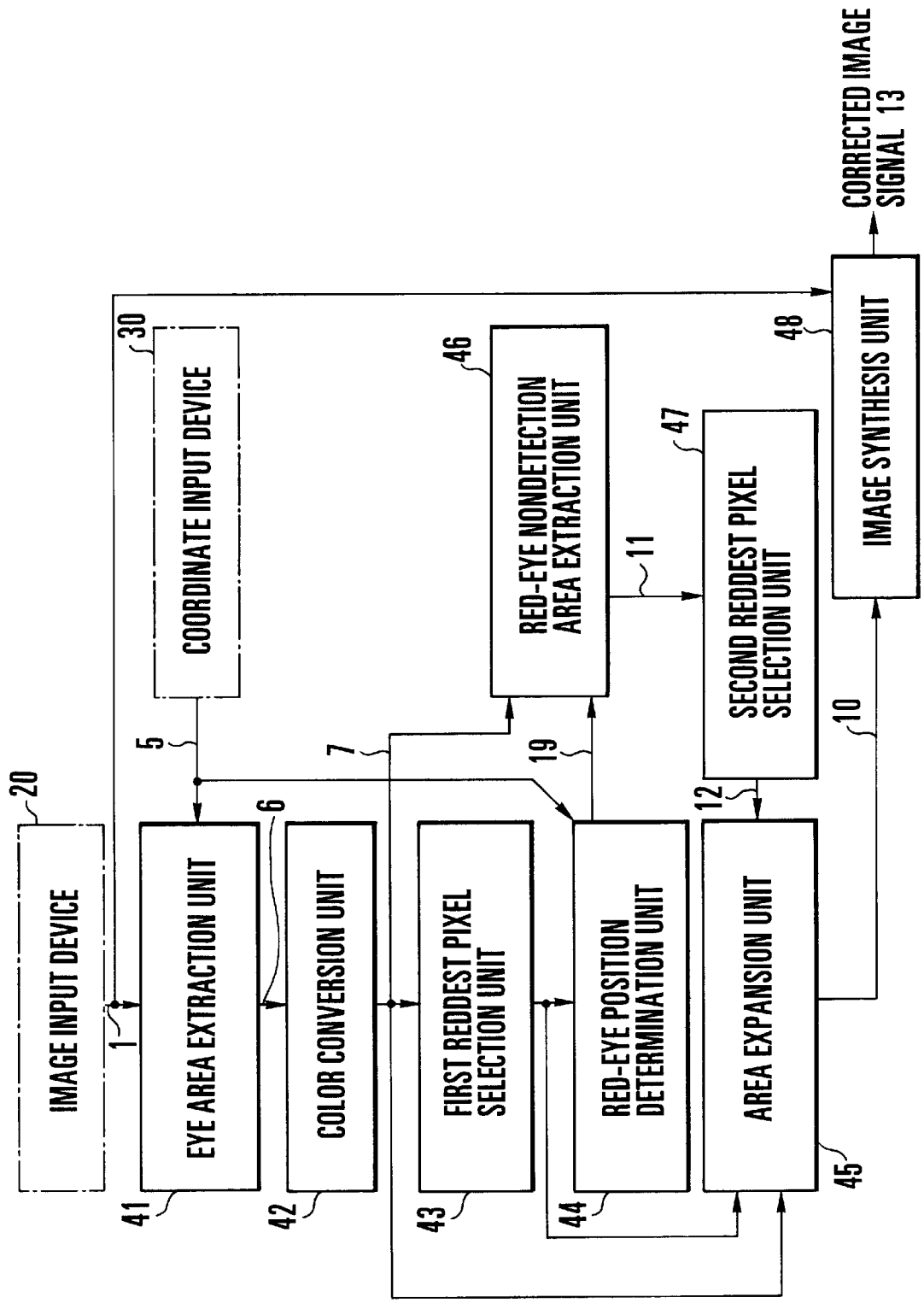
FIG. 6 is a block diagram showing the arrangement of a red-eye detection/retouch apparatus according to the second embodiment of the present invention.

FIG. 6 shows the arrangement of a red-eye detection/retouch apparatus according to the second embodiment of the present invention. The same reference numerals as in FIG. 1 denote the same parts in FIG. 6, and a detailed description thereof will be omitted. Referring to FIG. 6, an input image signal 1 obtained by an image input device 20 and including a red eye and an area designation signal 5 obtained by a coordinate input device 30 and representing a small area including the red eye and designated by the user are input to an eye area extraction unit 41. The area including the red eye is extracted and output as an eye area image signal 6. The eye area image signal 6 is converted from the RGB color expression into a color expression for easily detecting the red eye, e.g., the HSV color expression by a color conversion unit 42 and output as an eye area color conversion image signal 7. This color conversion will be described later. The eye area color conversion image signal 7 is input to a first reddest pixel selection unit 43. The reddest pixel is detected, and the coordinate values and color information of the pixel are output as a first red-eye position and color signal 8.

The area designation signal 5 and the first red-eye position and color signal 8 are input to a red-eye position determination unit 44 to determine whether the other red eye is present on the basis of the red-eye detection position in the designated area. If the red eye is detected at the edge of the area, it is determined that the other red eye is present on the opposite side. An area extraction driving signal 9 is output as an instruction signal for extracting the area where the other red eye is present. This determination is executed on the basis of conditions (1).

Upon receiving the eye area color conversion image signal 7, a red-eye nondetection area extraction unit 46 extracts the area where the other red eye exists on the basis of the area extraction driving signal 9 and outputs the area as a nondetection area image signal 11. Upon receiving the nondetection area image signal 11, a second reddest pixel selection unit 47 detects the reddest pixel and outputs the coordinate values and color information of the detected pixel as a second red-eye position and color signal 12.

Upon receiving the first red-eye position and color signal 8 and the second red-eye position and color signal 12, an area expansion unit 45 sequentially expands the area of pixels having similar colors around the detected pixel, thereby detecting a red-eye area and outputting the area as a red-eye area signal 10. Upon receiving the red-eye area signal 10 and the input image signal 1, an image synthesis unit 48 changes (corrects) the red-eye area to a natural pupil color and outputs a natural portrait image as a corrected image signal 13.

Conversion from the RGB (red, green, blue) color expression to the HSV color expression will be described next on the basis of "Image Analysis Handbook", Tokyo University Press, pp 486–487, 1991. In this reference, this conversion is entitled conversion based on an HSI hexagonal pyramid color model.

HSV means H (hue), S (shade), and V (value). With the color conversion, threshold setting for separating the brightness (value) from the color (hue and shade) is enabled. In addition, threshold setting for separating the sharpness (hue) of the color from the tone (hue) of the color is enabled. The colors can be easily processed, as compared to a case wherein the RGB color expression is directly used. Therefore, a more precise red-eye detection/retouch apparatus can be realized. The color expression is not limited to the HSV color expression. As far as the RGB color expression can be converted into a color expression for allowing similar threshold setting, the color conversion unit 42 can be used as a color conversion means of the present invention.

The value V is defined by equation (2):

$$V = \max\{R, G, B\} \quad (2)$$

where max{} is the function for returning the maximum one of values in the parenthesis.

If V is 0, H and S have values represented by equation (3):

$$\begin{cases} \text{When } V = 0, S = 0, H = \text{indefinite} \\ \text{Otherwise}, S = \frac{I - i}{I} \end{cases} \quad (3)$$

$i = \min\{R, G, B\}$, and H is obtained from equations (3) and (4);

where min{} is the function of returning the minimum one of values in the parenthesis.

Next, r, g, and b are obtained in accordance with equation (4):

$$\begin{cases} r = \frac{I - R}{I - i} \\ g = \frac{I - G}{I - i} \\ b = \frac{I - B}{I - i} \end{cases} \quad (4)$$

Finally, H is defined on the basis of equation (5), thereby converting the RGB color expression into the HSV color expression.

$$\begin{cases} \text{When } R = I, H = \frac{\pi}{3}(b - g) \\ \text{When } G = I, H = \frac{\pi}{3}(2 + r - b) \\ \text{When } B = I, H = \frac{\pi}{3}(4 + g - r) \end{cases} \quad (5)$$

In the second embodiment, the HSV color expression is used as the color expression after conversion by the color conversion unit 42. As far as the red area can be easily extracted, any color expression including a Lab color expression can be used, as a matter of course. In the second embodiment, the area expansion unit 45 sequentially expands the area of pixels having similar colors around the detected pixel to detect the red-eye area. Red-eye detection can also be performed even by expanding a circular area in consideration of the shape of the iris, or even by detecting the iris edge and expanding the area inside the edge.

Figure 7:
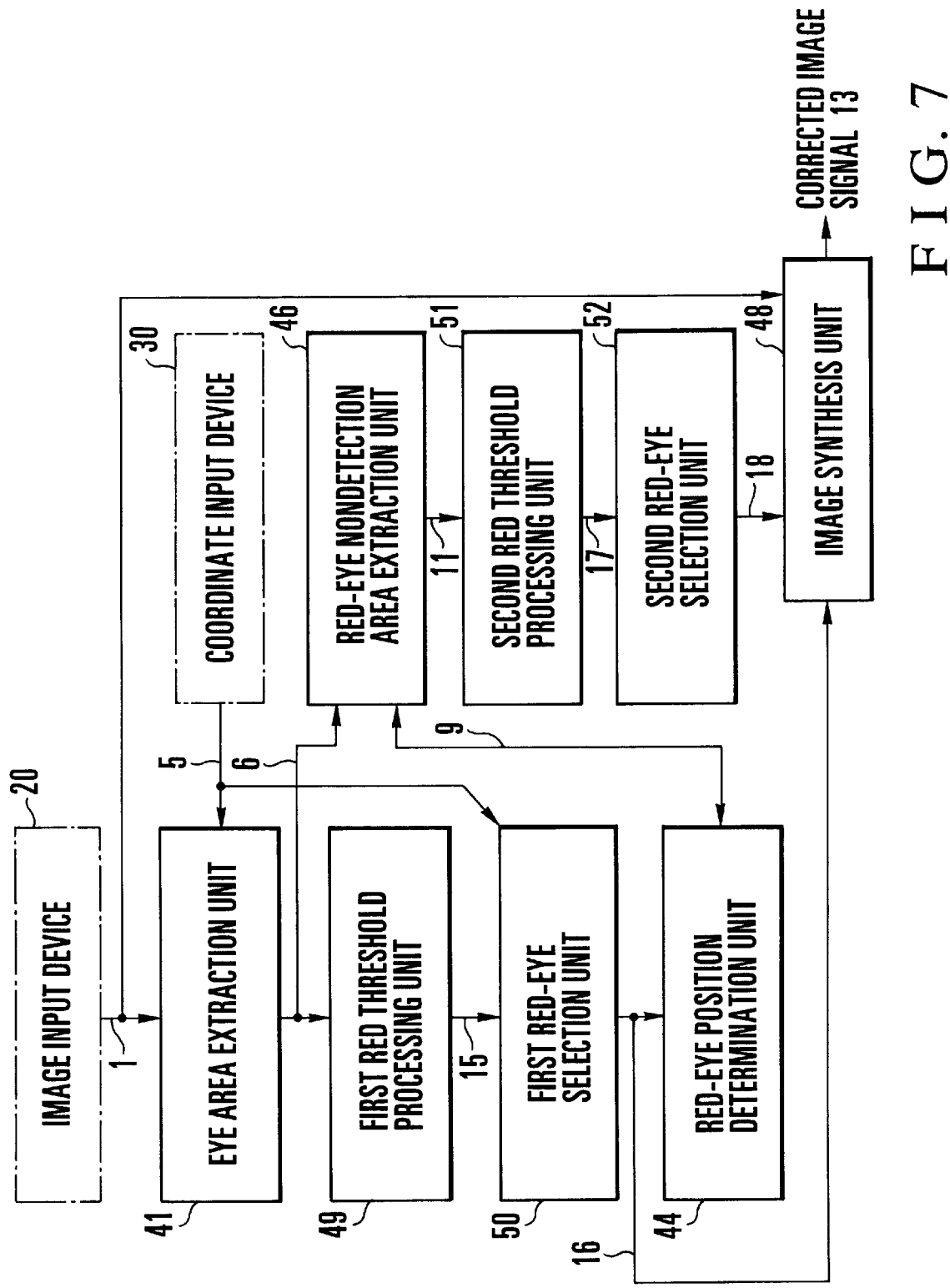
FIG. 7 is a block diagram showing the arrangement of a red-eye detection/retouch apparatus according to the third embodiment of the present invention.

FIG. 7 shows the arrangement of a red-eye detection/retouch apparatus according to the third embodiment of the present invention. The same reference numerals as in the first embodiment denote the same parts in FIG. 7, and a detailed description thereof will be omitted. Referring to FIG. 7, an input image signal 1 obtained by an image input device 20 and including a red eye and an area designation signal 5 obtained by a coordinate input device 30 and representing a small area including the red eye and designated by the user are input to an eye area extraction unit 41. The area including the red eye is extracted and output as an eye area image signal 6. The eye area image signal 6 is input to a first red threshold processing unit 49. One or a plurality of red areas are detected using a predetermined threshold value, and the coordinate positions, shape information, and color information of the red area are output as a first red-eye area candidate signal 15. The first red-eye area candidate signal 15 is input to a first red-eye selection unit 5Q. A circular red area is selected as a red-eye area, and the position, shape information, and color information of the red-eye area are output as a first red-eye area signal 16. The condition that the area is red and circular can be realized by calculating the cost and the like of equation (6).

The area designation signal 5 and the first red-eye area signal 16 are input to a red-eye position determination unit 44 to determine whether the other red eye is present on the basis of the red-eye detection position in the designated area. If the red eye is detected at the edge of the area, it is determined that the other red eye is present on the opposite side. An area extraction driving signal 9 is output as an instruction signal for extracting the area where the other red eye is present. This determination can be realized on the basis of conditions (1). The appearance of red color is calculated using the absolute value of the difference between the average color of pixels in the area and a predetermined red-eye color. For the appearance of circular shape, the distance between the center of gravity of the area and an area boundary point is calculated. The appearance of circular shape is calculated using the absolute value of the difference between the average value of the calculated distances and the distance between the area boundary points.

Upon receiving the eye area image signal 6, a red-eye nondetection area extraction unit 46 extracts the area where the other red eye exists on the basis of the area extraction driving signal 9 and outputs the area as a non.detection area image signal 11. Upon receiving the nondetection area image signal 11, a second red threshold processing unit 51 detects one or a plurality of red-eye areas on the basis of a predetermined. threshold value and outputs the coordinate positions, shape information, and color information of the red-eye area as a second red-eye area candidate signal 17. The second red-eye area candidate signal 17 is input to a second red-eye selection unit 52. A circular red area is selected as a red-eye area, and the position, shape information, and color information of the red-eye area are output as a second red-eye area signal 18. Upon receiving the first red-eye area signal 16, the second red-eye area signal 18, and the input image signal 1, an image synthesis unit 48 changes (corrects) the red-eye area to a natural pupil color, and outputs a natural portrait image as a corrected image signal 13.

In the first embodiment, a point in the red-eye area is selected by the first and second reddest pixel selection units, and thereafter, the red-eye area is acquired by the area expansion unit. In the third embodiment, a plurality of candidates for the red-eye area are obtained from the input signal by the first and second red threshold processing units. Thereafter, an area that appears to be a red-eye area is selected and acquired from the candidates on the basis of the shape information and color information. With this arrangement, a practical red-eye detection/retouch apparatus can be realized, unlike the prior art in which the red-eye areas are listed only by threshold processing.

The appearance of red-eye area can be realized by calculating the cost on the basis of, e.g., equation (6):

$$\text{Cost} = (\text{Appearance of red color}) + (\text{Appearance of circular shape}) \quad (6)$$

The appearance of red color means the cost which have a smaller value as the color becomes closer to the predetermined red color and, more specifically, can be realized by the absolute value of the difference from the defined value. The appearance of circular shape means the cost which has a smaller value as the shape of the area becomes closer to the circular shape and, more specifically, can be realized by dispersion of the distance between the center of gravity of the area and each area. boundary coordinate point.

Figure 8:
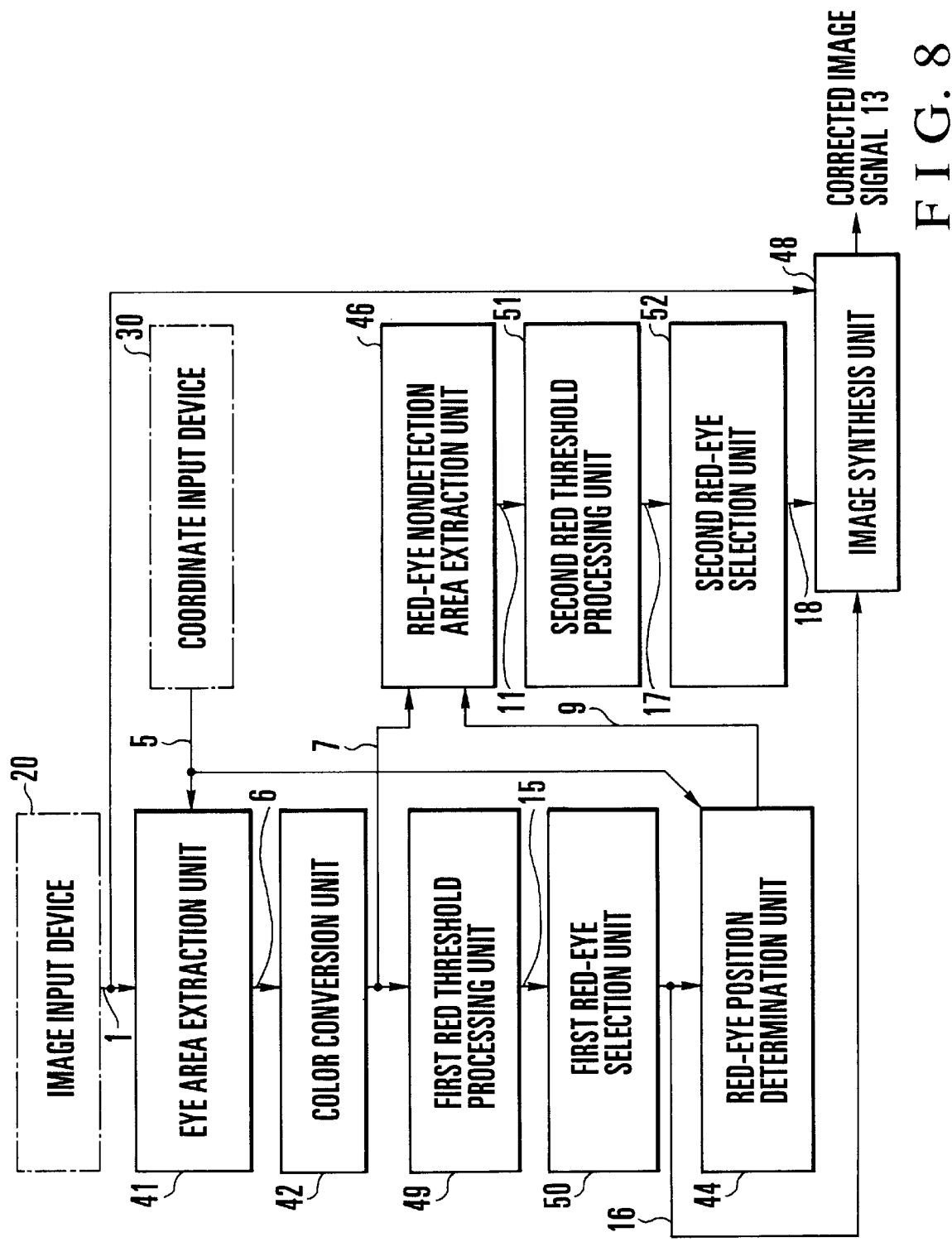
FIG. 8 is a block diagram showing the arrangement of a red-eye detection/retouch apparatus according to the fourth embodiment of the present invention.

FIG. 8 shows the arrangement of a red-eye detection/retouch apparatus according to the fourth embodiment of the present invention. The same reference numerals as in the first embodiment denote the same parts in FIG. 8, and a detailed description thereof will be omitted. Referring to FIG. 8, an input image signal 1 obtained by an image input device 20 and including a red eye and an area designation signal 5 obtained by a coordinate input device 30 and representing a small area including the red eye and designated by the user are input to an eye area extraction unit 41. The area including the red eye is extracted and output as an eye area image signal 6. The eye area image signal 6 is converted into a color expression for easily detecting the red eye, e.g., the HSV color expression by a color conversion unit 42 and output as an eye area color conversion image signal 7. Conversion from the RGB to the HSV color expression can be performed on the basis of equations (2) to (5). The eye area color conversion image signal 7 is input to a first red threshold processing unit 49. One or a plurality of red areas are detected using a predetermined threshold value, and the coordinate positions, shape information, and color information of the red area are output as a first red-eye area candidate signal 15. The first red-eye area candidate signal 15 is input to a first red-eye selection unit 50. A circular red area is selected as a red-eye area, and the position, shape information, and color information of the red-eye area are output as a first red-eye area signal 16. The condition that the area is red and circular can be realized by calculating the cost and the like of equation (6). The appearance of red color is calculated using the absolute value of the difference between the average color of pixels in the area and a predetermined red-eye color. For the appearance of circular shape, the distance between the center of gravity of the area and each area boundary point is calculated. The appearance of circular shape is calculated using the absolute value of the difference between the average value of the calculated distances and the distance between the area boundary points.

The area designation signal 5 and the first red-eye area signal 16 are input to a red-eye position determination unit 44 to determine whether the other red eye is present on the basis of the red-eye detection position in the designated area. If the red eye is detected at the edge of the area, it is determined that the other red eye is present on the opposite side. An area extraction driving signal 9 is output as an instruction signal for extracting the area where the other red eye is present.

Upon receiving the eye area color conversion image signal 7, a red-eye nondetection area extraction unit 46 extracts the area where the other red eye exists on the basis of the area extraction driving signal 9 and outputs the area as a second nondetection area image signal 11. Upon receiving the nondetection area image signal 11, a second red threshold processing unit 51 detects one or a plurality of red areas on the basis of a predetermined threshold value and outputs the coordinate positions, shape information, and color information of the red area as a second red-eye area candidate signal 17. The second red-eye area candidate signal 17 is input to a second red-eye selection unit 52. A circular red area is selected as a red-eye area, and the position, shape information, and color information of the red-eye area are output as a second red-eye area signal 18. Upon receiving the first red-eye area signal 16, the second red-eye area signal 18, and the input image signal 1, an image synthesis unit 48 changes (corrects) the red-eye area to a natural pupil color, and outputs a natural portrait image as a corrected image signal 13.

In the fourth embodiment, the HSV color expression is used as the color expression after conversion by the color conversion unit 42. As far as the red area can be easily extracted, any color expression including a Lab color expression can be used, as a matter of course.

As has been described above, according to the present invention, the area including one or two red eyes is designated by the user in the picked up image having red eyes. With this arrangement, a red-eye detection/retouch apparatus having a high detection ability, which automatically determines the number of red eyes in the area, detects the positions of the red eyes, and corrects the red eyes can be provided.

The conventional apparatus simply applies red-eye detection processing to a designated area without considering the number or location of eyes in the area. In the present invention, when the pixel which is most likely to be a red eye is located at the edge of the red-eye designation area, it is determined that the other red eye is present on the opposite side, and the red eye is detected. With this processing, the position of the pixel which is most likely to be the red eye is independently obtained within the processing range. Therefore, a practical red-eye detection/retouch apparatus is realized, unlike the prior art in which the red-eye areas are listed only by threshold processing.

In addition, instead of simply detecting a pixel having a similar color around the reddest pixel on the basis of the coordinate values and color of the reddest pixel, the area is expanded in consideration of the shape of the iris, .i.e., the circular shape. With this processing, the red-eye area extraction accuracy is increased.

Furthermore, the color conversion means for converting the color expression into a color expression for easily detecting a red eye is arranged at the subsequent stage of the eye area extraction means. With this arrangement, the RGB color expression can be easily converted into the HSV color expression, and threshold setting for red detection can be easily made.

What is claimed is:

1. A red-eye detection/retouch apparatus comprising:
    first area extraction means for receiving an image including a red eye and a signal representing a small area including said red eye and designated by a user and extracting a first area including said red eye;
    first pixel selection means for detecting the reddest pixel from said first area output from said first area extraction means and outputting coordinate values and color information of said detected pixel;
    determination means for determining whether the other red eye is present on the basis of the signal representing said small area including said red eye and designated by the user and the coordinate values of said reddest pixel output from said first pixel selection means, said determination means outputting an instruction signal for extracting a second area where said other red eye is present upon determining that said other red eye is present;
    second area extraction means for receiving the instruction signal output from said determination means and extracting said second area from said first area output from said first area extraction means;
    second pixel selection means for detecting the reddest pixel from said second area output from said second area extraction means and outputting coordinate values and color information of said detected pixel;
    area expansion means for receiving the coordinate values and color information output from said first pixel selection means, the coordinate values and color information output from said second pixel selection means, and said first area output from said first area extraction means, detecting a red-eye area by area expansion, and outputting said red-eye area; and
    image synthesis means for receiving said red-eye area output from said area expansion means and the image including said red eye and outputting an image whose red-eye area has been corrected to a natural pupil color.

2. An apparatus according to claim 1, further comprising color conversion means for converting a color expression of said first area output from said first area extraction means into a color expression for easily detecting a red eye, and
    wherein said area expansion means receives the coordinate values and color information output from said first pixel selection means, the coordinate values and color information output from said second pixel selection means, and a second area signal color-converted and output from said color conversion means, and detects said red-eye area by area expansion based on an iris shape.

3. An apparatus according to claim 2, wherein said first pixel selection means detects said reddest pixel from said first area color-converted and output from said color conversion means and outputs the coordinate values and color information of said detected pixel, and
    said second area extraction means receives the instruction signal output from said determination means and extracts said second area from said first area color-converted and output from said color conversion means.

4. An apparatus according to claim 2, wherein said color conversion means converts an RGB color expression into an HSV color expression.

5. An apparatus according to claim 1, further comprising image input means for receiving an image signal including a red eye and outputting the image signal to said first area extraction means and said image synthesis means, and
    coordinate input means for receiving said small area including said red eye and designated by the user and outputting said small area to said first area extraction means and said determination means.

6. A red-eye detection/retouch apparatus comprising:
    first area extraction means for receiving an image including a red eye and a signal representing a small area including said red eye and designated by a user and extracting a first area including said red eye;
    color conversion means for converting a color expression of said first area output from said first area extraction means into a color expression for easily detecting a red eye;
    first pixel selection means for detecting the reddest pixel from said first area output from said color conversion means and outputting coordinate values and color information of said detected pixel;
    determination means for determining whether the other red eye is present on the basis of the signal representing said small area including said red eye and designated by the user and the coordinate values of said reddest pixel output from said first pixel selection means, said determination means outputting an instruction signal for extracting a second area where said other red eye is present upon determining that said other red eye is present;
    second area extraction means for receiving the instruction signal output from said determination means and extracting said second area from said first area color-converted and output from said color conversion means;

second pixel selection means for detecting the reddest pixel from said second area output from said second area extraction means and outputting coordinate values and color information of said detected pixel;

area expansion means for receiving the coordinate values and color information output from said first pixel selection means, the coordinate values and color information output from said second pixel selection means, and said first area color-converted and output from said color conversion means, detecting a red-eye area by area expansion, and outputting said red-eye area; and image synthesis means for receiving said red-eye area output from said area expansion means and the image including said red eye and outputting an image whose red-eye area has been corrected to a natural pupil color.

7. A red-eye detection/retouch apparatus comprising:

first area extraction means for receiving an image including a red eye and a signal representing a small area including said red eye and designated by a user and extracting a first area including said red eye;

first threshold processing means for detecting at least one red area from said first area output from said first area extraction means by threshold processing and outputting a position, shape information, and color information of said detected area;

first selection means for selecting an area which is most likely to be a red eye on the basis of the position, shape information, and color information output from said first threshold processing means and outputting a position, shape information, and color information of said selected area;

determination means for determining whether the other red eye is present in said area on the basis of the signal representing said small area including said red eye and designated by the user and the position of said red-eye area output from said first selection means, said determination means outputting an instruction signal for extracting a second area where said other red eye is present upon determining that said other red eye is present;

second area extraction means for receiving the instruction signal output from said determination means and extracting said second area from said first area output from said first area extraction means;

second threshold processing means for detecting at least one red area from said second area output from said second area extraction means by thresh old processing and outputting a position, shape information, and color information of said detected area;

second select io n means for selecting an area which is most likely to be ared eye on the basis of the position, shape information, and color information output from said second threshold processing means and outputting a position, shape information, and color information of said selected area; and image synthesis means for receiving the positions, shape information, and color information output from said first and second selection means and the image including said red eye and outputting an image whose red-eye area has been corrected to a natural pupil color.

8. An apparatus according to claim 7, further comprising color conversion means for converting a color expression of said first area output from said first area extraction means into a color expression for easily detecting a red eye, and wherein said second area extraction means receives the instruction signal output from said determination means and extracts said second area from said first area color-converted and output from said color conversion means.

9. An apparatus according to claim 8, wherein said color conversion means converts an RGB color expression into an HSV color expression.

10. An apparatus according to claim 7, further comprising image input means for receiving an image signal including a red eye and outputting the image signal to said first area extraction means and said image synthesis means, and coordinate input means for receiving said small area including said red eye and designated by the user and outputting said small area to said first area extraction means and said determination means.

* * * * *